Feb. 4, 1969  J. LAULIAC  3,426,139
POTTED EQUIPMENT INCLUDING A HEAT TRANSFER DEVICE
Filed March 17, 1966
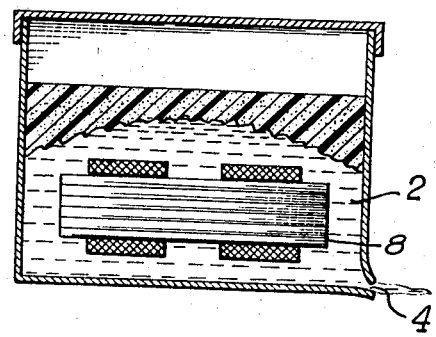
Fig.1
Fig.2
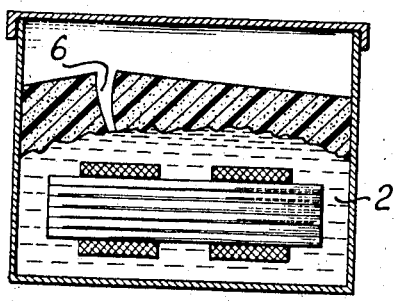
Fig.3
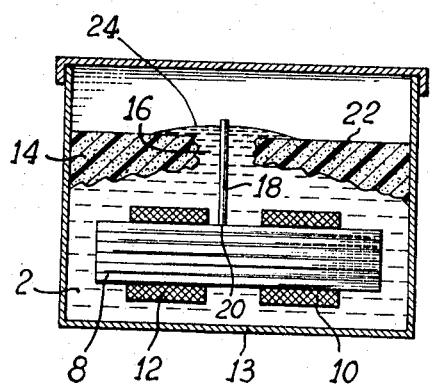
Fig.4
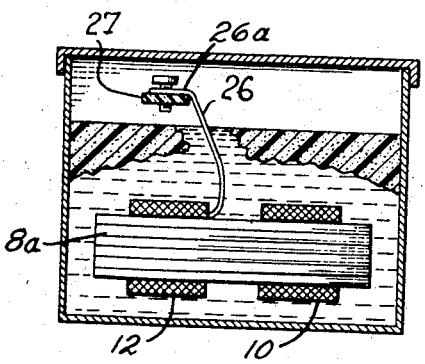
Fig.5
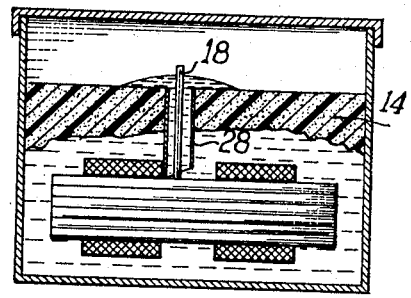
APPLICANT
Jean Lauliac
BY Misegades & Douglas
ATTORNEYS

United States Patent Office 3,426,139
Patented Feb. 4, 1969

3,426,139
POTTED EQUIPMENT INCLUDING A HEAT TRANSFER DEVICE
Jean Lauliac, Viroflay, France, assignor to Claude Paz et Visseaux
Filed Mar. 17, 1966, Ser. No. 535,082
Claims priority, application France, Mar. 18, 1965, 9,678, Patent 1,436,783
U.S. Cl. 174—15
Int. Cl. H01b 7/34, 9/06
7 Claims

ABSTRACT OF THE DISCLOSURE

Heat transfer device to assure that the casing of potted equipment does not crack and the hermetic seal of the potting mixture is retained in spite of the fact that the heat generated by the potted equipment is sufficient to melt and expand some of the potting mixture.

---

This invention relates to hermetically sealed or potted electrical apparatus wherein the potting mixture expands noticeably when one or more of its component parts melts and more particularly, to potted equipment including heat transfer devices.

When heating occurs in a potting mixture comprising, for example, silica sand and paraffin wax the volume of the paraffin wax increases by about twenty percent as it melts. When the temperature of an area of the surface of the electrical apparatus exceeds the melting temperature of the paraffin wax, the latter melts, which noticeably increases the volume of the potting mixture. The apparatus is enclosed in the potting mixture and contained in a casing with which it is in close physical contact. The molten, expanded mixture strains the casing and can escape either by cracking through a seam of the casing, opened under the pressure; or the mixture can split the non-molten portion of the potting mixture, thus creating one or a plurality of cracks through which the molten portion of the mixture flows. Upon cooling, the molten mixture does not completely return to its initial location and the cracks do not close tightly. Thus, the hermetic seal is lost and outside moisture can now get into the previously sealed electrical apparatus.

The object of this invention is to avoid losing the hermetic seal due to the expansion of the potting compound. Its main feature is a heat-transmitting device linking the portion of the surface of the potted apparatus which is the warmest during the operation with the upper surface of the potting mixture. The temperature along the heat-transmitting device is higher or only a little bit lower than the temperature of the warmest portion of the apparatus to which the heat-transmitting device is linked. The said heat-transferring device, is for instance, a copper rod of small diameter (two to four millimeters in diameter, for example). The heat-transferring device provides an "escape hatch" path for the molten, expanded mixture.

A hollow and airtight metal capsule or a plastic foam article might be placed in the vicinity of the warm portion. However, space is usually lacking for the appropriate location of a capsule or of an article capable of shrinking sufficiently and of resuming its initial volume.

Other objects and features of the invention will become apparent from the following description of the invention taken in conjunction with the accompanying drawings wherein:

FIGS. 1 and 2 are sectional views showing incidents which may occur when not using the invention.

FIGS. 3 to 7 are sectional views of various embodiments of the invention.

FIG. 1 shows the molten potting mixture leaking through a seam 4 of the casing, which has been opened under pressure. The molten mixture does not return to the casing when the temperature of the electrical apparatus previously hermetically sealed cools down.

FIG. 2 shows the molten potting mixture splitting the non-molten portion of the potting mixture, thus creating one or several cracks such as crack 6 through which the potting mixture can flow. Upon cooling, the molten mixture does not seal or may not properly seal the cracks such as crack 6.

Figure 6:
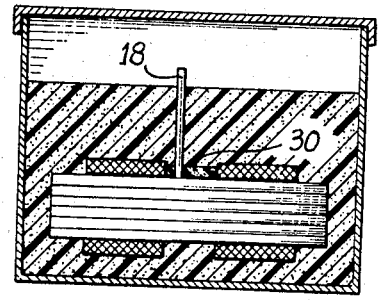

Referring now to the drawings, FIG. 1 shows a container or casing which includes an electrical apparatus submerged in a coating 2, the coating being a mixture of silica sand and paraffin wax, which when heated too high partially melts and leaks through a seam 4 of the casing which is opened by pressure in the casing. Due to the position of the casing, the molten coating 2 does not return to the casing when the temperature of the apparatus is caused to cool down.

In FIG. 2, the molten portion of the coating consisting of a mixture of silica sand and paraffin wax causes a split, break of crack 6 in a non-molten portion, the crack being created such that the molten expanding coating 2 is caused to flow through the crack. Upon cooling, the molten coating returns substantially wholly into and within its initial location, but it is found that the cracks do not close tightly so that outside moisture is able to enter therein.

FIG. 3 shows an electrical apparatus, which includes magnetic core 8 and windings 10, 12, and is embedded in a potting mixture contained in casing 13. A portion 2 of the potting mixture, nearest to the apparatus, is molten, but portion 14, farther from the apparatus, is solid, except in area 16, where it is purposely melted by the device which features the invention.

In the case of FIG. 3, the device is a copper rod 18, 2 to 4 mm. in diameter, which contacts the top of the magnetic core at point 20 between windings 10 and 12; this point is one of the warmest of the apparatus surface since it forms a hollow between the windings and lies away from casing 13, through which heat is removed.

When the apparatus operates, rod 18 assumes a temperature close to that of point 20. When the paraffin wax melts at point 20, it melts or softens around rod 18 and flows along the latter, thus forming channel 16; it then overflows on free surface 22 of the coating, carrying along a little of the sand mixed with it and forming a small pool 24. When the appliance cools down, the amount 2 of the potting mixture which has melted shrinks, and the mixture which formed pool 24 runs down rod 18; if a small portion remains on surface 22, around channel 16, the amount of coating running down almost compensates for the shrinkage of amount 2 and fills the space around rod 18.

On FIG. 4, one or several of the connecting wires of the apparatus are substituted for rod 18. In the instance shown, where the apparatus is a high-voltage transformer 8a for an electric discharge tube, wire 26, one of the wires energizing the primary winding of the transformer, has a large cross-section, such as 10 mm.² instead of the customary 1–3 mm.²

The cross section of the wire may conversely be reduced to 0.05 mm.², or the wire may be made of Nichrome with 0.13 mm.² cross-section; the wire is thus slightly warmed up by the current and a similar melting action is achieved as described above with respect to FIG. 3.

Several of the wires energizing the primary winding may be used, with a large cross-section or a notable electrical resistance.

So as to reduce the length of the wire, its free end 26 is carried, inside the housing, by insulating strip 27, with low thermal conductivity, which reduces the cooling of the wire.

The embodiment according to FIG. 5 differs from the one shown on FIG. 3 by the presence of heat-insulating sheath 28 around a portion of rod 18, with an inner diameter notably larger than the diameter of the rod; if a tube was substituted for the rod, the sheath might fit it tightly. The sheath covers the entire portion of the rod structurally located inside the coating. The sheath is for instance a length of polyurethane foam tubing, with its lower end bevelled to facilitate the penetration of the molten potting mixture; it reduces the cooling of the rod, and therefore makes it possible to reduce the diameter of the rod.

The sheath may also be used to heat-insulate connecting wires used for creating a channel of molten potting mixture as on FIG. 4.

FIG. 6 shows another variation of the embodiment according to FIG. 3. Rod 18 is in contact with a portion of the surface of the apparatus, which portion is covered with a heat-insulating part 30; it is thus ensured that this portion of the surface is the warmest, or at least almost reaches the temperature of the warmest portion of the surface. This arrangement is useful when the distribution of temperatures at the surface of electrical apparatus makes it impossible to locate rod 18 appropriately without artificial heating.

Figure 7:
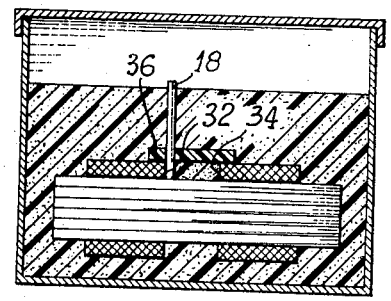

In this case, as in the case of FIG. 7, the potting mixture is shown cold.

FIG. 7 shows a case in which the potting mixture can melt simultaneously within two portions 32, 34 of the surface of the apparatus between which is a comparatively cold portion. Two rods such as 18 might be used. In the embodiment shown, only one rod is used ending within the proximity of portion 32; insulating strip 36 creates and maintains above the magnetic core 8 a comparatively warm path along which the molten and ex-expanded potting mixture within portions 32, 34 may join the rod 18.

Figure 8:
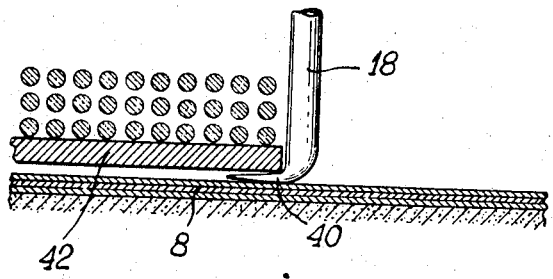
FIGS. 8, 9, 10 are diagrammatic views showing various means for fastening the heat transferring device. All those figures are diagrammatic sections.

FIG. 8 shows a means for fastening rod 18 in which end 40 of the rod is flattened and bent, then pushed in between magnetic core 8 and bobbin or spool of insulating material 42 of a coil.

Figure 9:
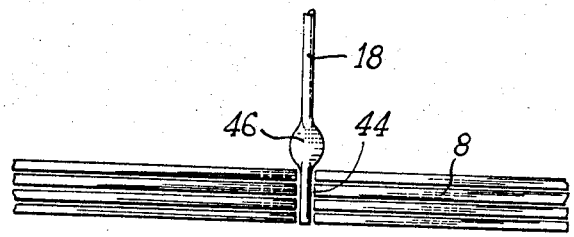
Figure 10:
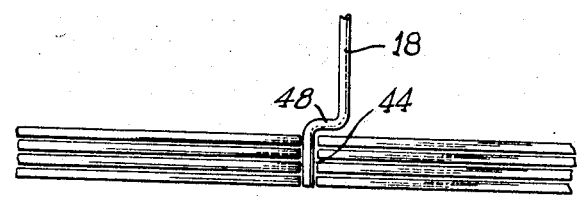

As shown in FIGS. 9 and 10, the end of the rod 18 may also be introduced into hole 44 provided through the sheets of the magnetic 8 core when the latter were cut. The depth of penetration of the rod may be limited by local crushing or forming of the rod by widened portion 46 on FIG. 9 or by bent portion 48, as shown on FIG. 10.

The arrangements shown may be altered without exceeding the scope of the invention. For instance, it is possible not to introduce rod 18 into the magnetic circuit or into the winding. In that case, it is often suitable to provide a means for heating the end of the rod. A loop may be formed inside which the leakage flux induces a current, or the end may go through a cylinder of the same metal, inside which eddy currents develop for causing the heating effect.

The cross-section of the magnetic circuit may also be reduced in the vicinity of the rod, so as to instigate local heating through saturation of the iron.

On other hand, it would be unsuitable to substitute a wide mass, such as a fin, for the rod or the thick wire: the heat-conducting device would be cooled too much by contact with the coating material, and its temperautre at the free surface of the potting mixture would differ notably from the temperature of the warm portion of the apparatus.

What I claim is:
1. A hermetically sealed electrical assembly comprising case means containing electrical apparatus,
   normally solidified potting mixture in said case surrounding said apparatus without completely filling said case,
   said potting mixture comprising a mixture of materials which expands noticeably when at least one of the materials melts, and
   heat-transmitting means terminating within said casing and extending from the surface of said apparatus to the upper surface of said potting mixture.
2. The assembly of claim 1, wherein said heat-transmitting means comprises a metal rod with good thermal conductivity.
3. The assembly of claim 1, wherein said heat-transmitting means comprises a metal tube with good thermal conductivity.
4. The assembly of claim 1, wherein said heat-transmitting means comprises wire heated by the passage therethrough of electric current.
5. The assembly of claim 1, wherein said heat-transmitting means is surrounded at least over a part of the lennght thereof with a loose fitting sheath.
6. The assembly of claim 1, wherein means are provided for assuring that the point of coupling between said heat-transmitting means and said apparatus is the warmest portion of the surface of said apparatus during the operation of said apparatus.
7. The assembly of claim 1, wherein said apparatus comprises inductor means, and
   wherein said heat-transmitting means is coupled to the cores of said inductor.

References Cited
UNITED STATES PATENTS

| 2,628,342 | 2/1953 | Taylor | 336—96 X |
| 2,775,742 | 12/1956 | Bogue et al. | 336—96 X |

LEWIS H. MEYER, *Primary Examiner.*

A. T. GRIMLEY, *Assistant Examiner.*

U.S. Cl. X.R.

174—52; 317—9